United States Patent
Pickering et al.

(10) Patent No.: US 8,799,617 B2
(45) Date of Patent: Aug. 5, 2014

(54) MEMORY MANAGEMENT UNIT AND METHOD OF ACCESSING AN ADDRESS

(75) Inventors: Stephen Pickering, Hamilton (GB); Edward J. Hathaway, Austin, TX (US); Christian Vetterli, Zurich (CH); Michael C. Wood, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 999 days.

(21) Appl. No.: 12/375,848

(22) PCT Filed: Aug. 1, 2006

(86) PCT No.: PCT/EP2006/064919
§ 371 (c)(1),
(2), (4) Date: Jan. 30, 2009

(87) PCT Pub. No.: WO2008/014817
PCT Pub. Date: Feb. 7, 2008

(65) Prior Publication Data
US 2009/0313414 A1   Dec. 17, 2009

(51) Int. Cl.
*G06F 12/00*   (2006.01)
*G06F 12/06*   (2006.01)

(52) U.S. Cl.
CPC ................... *G06F 12/0615* (2013.01)
USPC ................... 711/200; 711/211; 711/E12.078

(58) Field of Classification Search
USPC .................................. 711/211, 213
See application file for complete search history.

(56) References Cited

U.S. PATENT DOCUMENTS

| | | | |
|---|---|---|---|
| 5,109,334 A | 4/1992 | Kamuro | |
| 5,317,706 A | 5/1994 | Pechter | |
| 6,862,702 B2 * | 3/2005 | Ernst et al. | 714/718 |
| 2004/0243786 A1 * | 12/2004 | Roche et al. | 711/213 |

FOREIGN PATENT DOCUMENTS

| | | | | |
|---|---|---|---|---|
| EP | 0044924 A2 | 2/1982 | | |
| JP | 02064206 A * | 3/1990 | | F01D 25/00 |
| KR | 100266605 B1 * | 9/2000 | | H04K 1/04 |

OTHER PUBLICATIONS

PCT Search Report and Written Opinion, PCT/EP2006/064919, mailed Apr. 26, 2007.

* cited by examiner

*Primary Examiner* — Christopher Birkhimer

(57) ABSTRACT

A memory management unit comprises register and control logic and arranged to support a microprocessor controller unit accessing physical address space via an address bus wherein the microprocessor controller unit comprises a program counter having a first address size, the memory management unit wherein the register and control logic comprises a register having a second address size greater than the first address size and arranged to provide an extended address bus between the microprocessor controller unit and physical address space.

20 Claims, 4 Drawing Sheets

```
; L - pointer to data within page
; loopcount - size of data
; startofpage - memory address of page start
; lastbyteinpage - address of last byte in page area
L = address of where data starts in datapage
PAGE = pagenumberofdata
Loop: LDA   [L]   ;load accumulator indirectly via L
. . . Code to process data
DEC    loopcount
BEQ    done
;Check if addressing last byte in page
       CMP    L,#lastbyteinpage    ;L = address of last
 byte in page?
BNE    Next
INC    PAGE ;increment page number
BRA    Nextpage
L = startofpage
Next: INC   L
BRA    loop
Done: ;code complete…
```

FIG. 1

MEMORY MANAGEMENT UNIT AND METHOD OF ACCESSING AN ADDRESS

FIELD OF THE INVENTION

The present invention relates to a memory management unit and method of accessing an address in physical address space. The invention is applicable to, but not limited to, extending address space using a memory management unit.

BACKGROUND OF THE INVENTION

In the field of 8-bit and 16-bit microcontroller control units (MCUs), there is an increasing trend towards integrating ever-larger memory elements onto the MCUs, and accessing the data elements/individual addresses in these larger memory elements. For example, there is a consumer-driven demand to provide 128 Kbyte memory, and potentially 256 Kbytes (and more), of memory on an 8/16-bit MCU.

8/16-bit MCUs typically have a program counter that comprises 16-bits and instructions with addressing modes that only cater for up to a 16-bit address. This results in an addressable limit of 65,536 locations (i.e. the number of combinations of 16 0's and 1's). Thus, it is known that the program counter associated with MCUs is the limiting factor in accessing physical address space and consequently many current 8/16-bit MCUs are limited in that they are unable to support addressing an associated memory above 64 Kbytes.

Within MCUS, it is also known that a number of memory management units (MMUs) exist that comprise paging access mechanisms to access paged memory. However, it is also known that these paging access mechanisms fail to support accessing a particular memory line for data access in an efficient and easily usable manner.

Paged memory (sometimes referred to as banked memory) is a term that is used to describe a remapping of physical memory to an address within the address capability of the MCU device. An example of code required to access data in such a paged memory would typically be of the form illustrated in FIG. 1.

A page is typically a specific size, which is less than the addressable memory range of the device but is less than the physical address space desired. When accessing physical memory through this 'page' it may be necessary to re-map another page into the page's area, if the next sequential byte required is not within the current page. In addition, the index pointing to the paged memory typically needs to be adjusted to point to the start of the paged memory. Access to memory is non-linear and non-contiguous.

In typical paged memory designs there are two major issues in accessing paged memory for data, where both issues are known to severely impact performance:

(i) If code is executing from paged memory it is necessary to call a routine in unpaged memory to access data in another page, and make this available to the calling code.

(ii) As is often the case, data cannot fit within a single page and, thus, spans multiple pages. As a consequence, access mechanisms are very limited to accessing a particular page, for example accessing only 4K of memory, or a significant amount of effort is expended in order to access (for example check and update the page and pointer) data within the page space that crosses multiple pages.

Thus, a need exists for a microprocessor memory management unit and mechanism therefor that enables data in memory space to be accessed in a more efficient manner.

SUMMARY OF THE INVENTION

In accordance with aspects of the present invention, there is provided a memory management unit (MMU) and method of operation therefor, as defined in the appended Claims.

BRIEF DESCRIPTION OF THE DRAWINGS

FIG. 1 illustrates an example of code required to access data in a known paged access mechanism.

Figure 2:
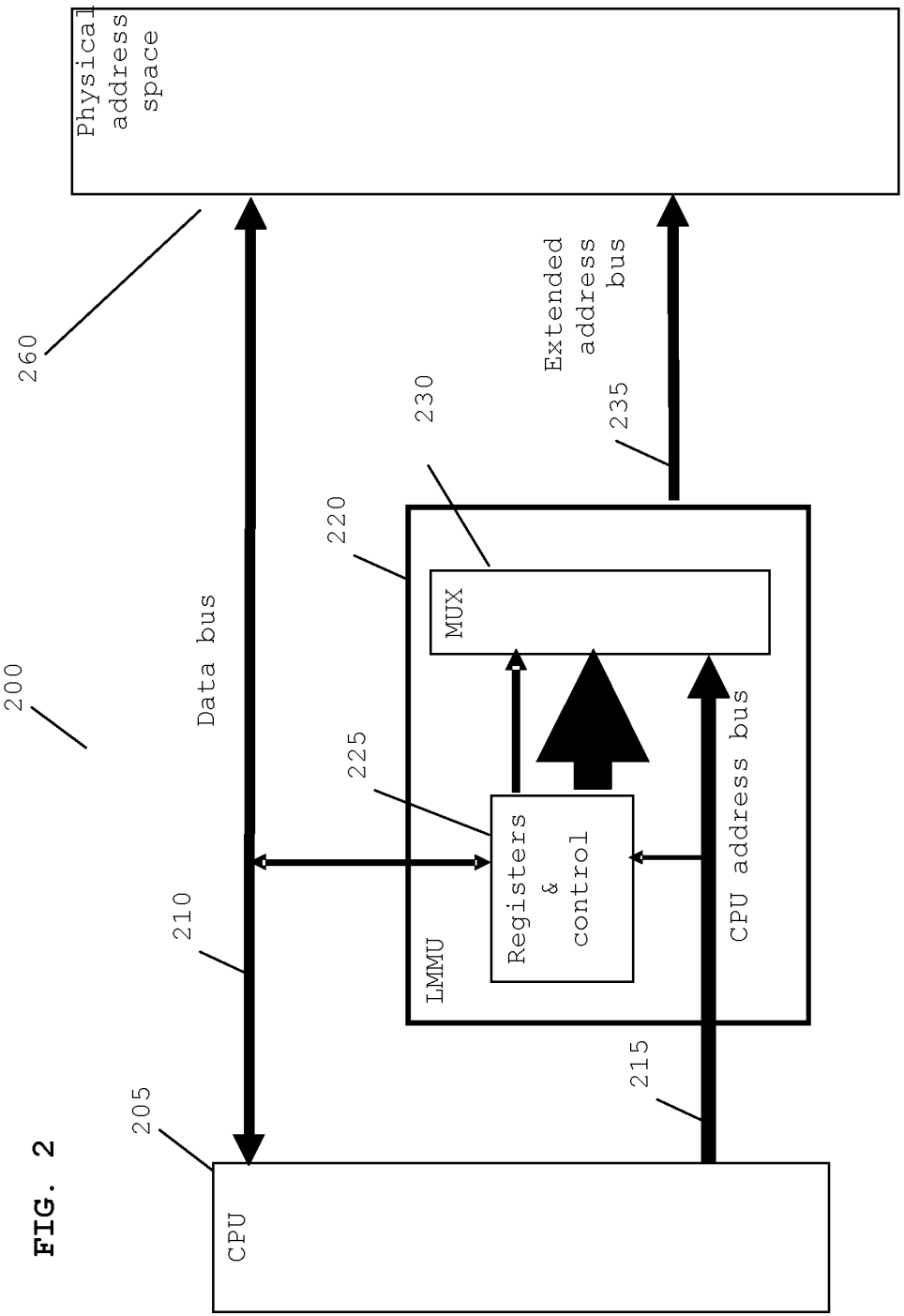
Figure 3:
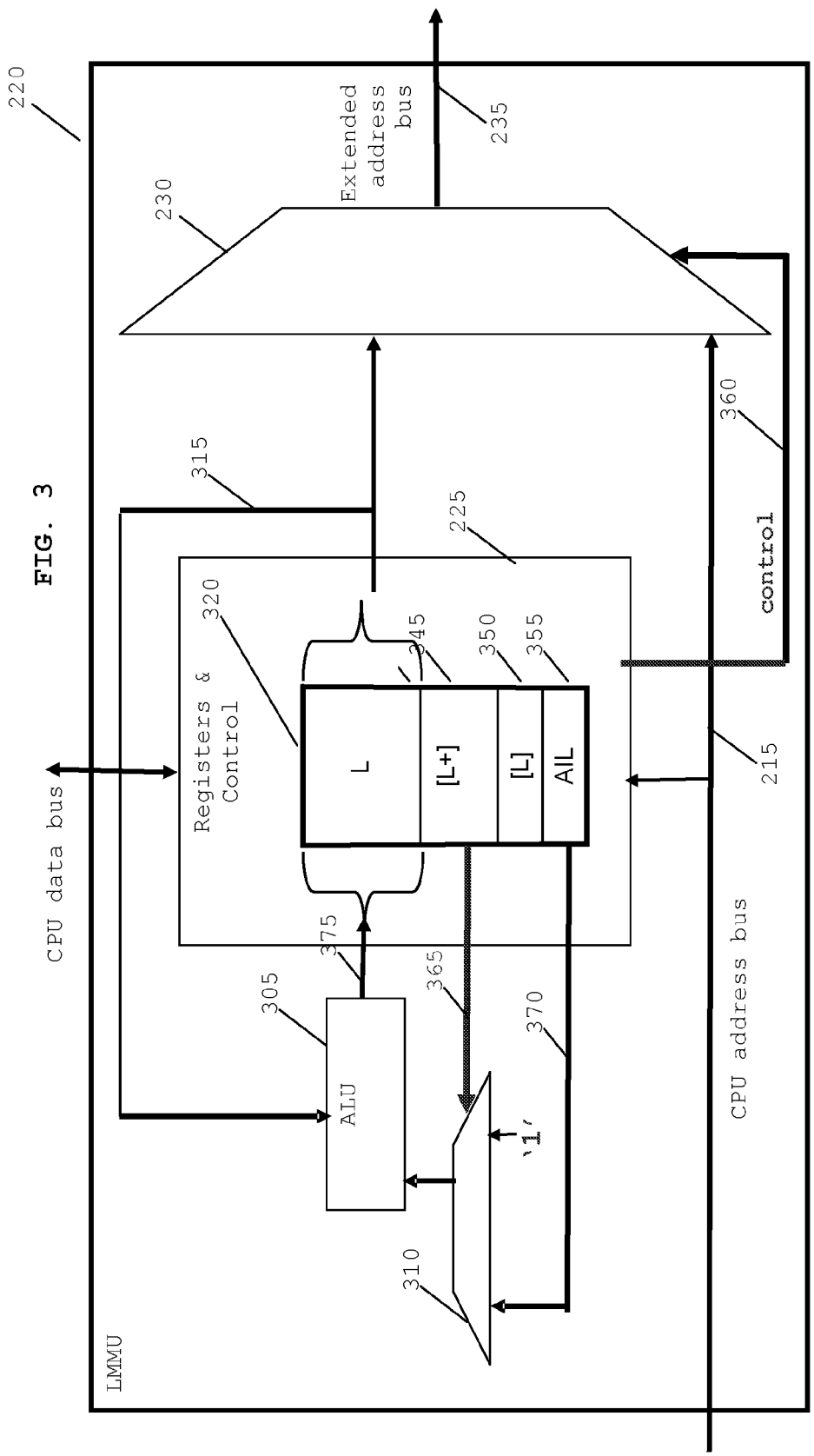
Figure 4:
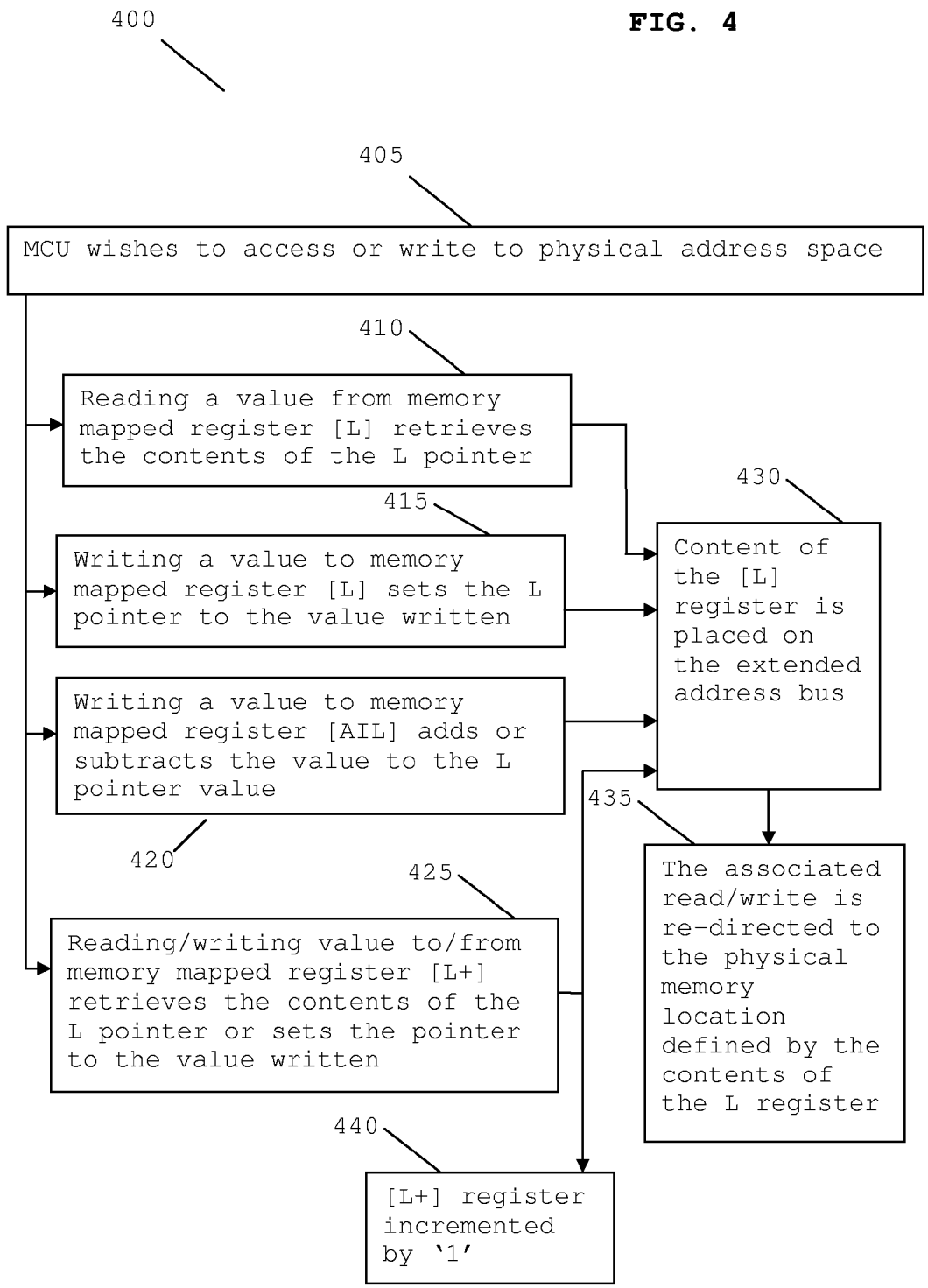

Exemplary embodiments of the present invention will now be described, by way of example only, with reference to the accompanying drawings, in which:

FIG. 2 illustrates an 8/16-bit micro-controller architecture according to one embodiment of the present invention;

FIG. 3 illustrates a linear memory management unit according to one embodiment of the present invention; and FIG. 4 illustrates a method of operation of a linear memory management unit (LMMU) according to one embodiment of the present invention.

DESCRIPTION OF EMBODIMENTS OF THE INVENTION

One embodiment of the present invention will be described in terms of an 8/16-bit microprocessor control unit that supports a method of addressing, say, 128 Kbytes of memory using, say, a linear memory management unit (LMMU) that operates on this extended address range in combination with the MCU normal addressing capability of say 64K.

Notably, an L register is provided that is arranged to be a greater addressable size than the program counter in prior art arrangements. Notably, when the L register is placed on the address bus it is configured such that it is able to exceed the limits of the program counter. Thus, in this manner, the 'L' register effectively becomes the program counter for data access read/write operations. In effect, the address space that was provided by the program counter in prior art arrangements has been extended by the 'L' register.

In one embodiment of the present invention, an automatic incrementing of the address accessed using the 'L' register is facilitated, thereby alleviating or negating the need to check the accessing of memory.

The inventive concept is applicable to, but not limited to, extending data address space with a memory management unit in a micro-controller unit (MCU). Advantageously, the extended data address space provides a contiguous data space and is achieved in an easy to use manner. The contiguous data space is achieved by providing a pointer that is able access data space by starting at, say, a bottom of the address space and extend to, say the top of the address space. Furthermore, the inventive concept supports byte and multi-byte access with an optional auto-incrementing pointer as well as supporting pointer arithmetic.

In the context of the present invention, 'linear address space' encompasses the concept of a pointer that can be positioned at a beginning of an address space of the 'L' register and being able to be pointed to the end of the 'L' register without the need to loop values. In this regard each successive address increments. Hence, in the context of the present invention, the term 'linear', when referenced to accessing memory, encompasses an ability to access memory contiguously. This is in contrast to the known paging mechanisms that continuously loop, i.e. successively loop around '0-9' values.

In this regard, it is possible to access substantially all of a complete physical memory address space. In the context of the present invention, the definition of 'physical memory address space' encompasses how much real memory (address space) the MCU contains. The physical memory address space is larger than the addressable space of the MCU device, which is limited by the program counter's capabilities. The addressable space of the MCU encompasses how much the core processor is able to read from or write to memory unsupported. Thus, as substantially all of a complete physical memory address space is now accessible (for example by arranging the 'L' register to comprise 3 bytes (=24 bits) equating to a 16 Mbit address range that is significantly greater than the 64 kbit address space of a known program counter), there is no need to check for boundary conditions. Thus, the inventive concept extends the data address space to the limit of the L register and therefore beyond the limit imposed by the program counter.

For example, one set of code that supports the aforementioned linear access mechanism may be of the form:

```
            ; L - pointer to start of data
            ; loopcount - size of data
        Loop:
            LDA   [L+]
            Code to process data . . .
            DEC   loopcount
            BNE   loop.
```

Notably, data space in embodiments of the present invention is organised with its physical address being accessible through a linear memory management unit (LMMU). The inventive concept of the present invention allows simple access to a linear address space for data through a memory-mapped indirect register with an auto adder capability. Notably, this access to a linear address space for data is achieved without requiring any modifications to the instruction set or core.

Referring now to FIG. 2, a microprocessor architecture 200 according to one embodiment of the present invention is illustrated. The microprocessor architecture 200 comprises an 8/16-bit core (central processing unit (CPU)) 205 operably coupled to physical address space 260 via a data communication bus 210.

The CPU 205 is also operably coupled to a linear memory management unit (LMMU) 220 via address communication bus 215. The LMMU 220, in one embodiment of the present invention, is arranged as a pointer LMMU. In this embodiment, the pointer linear management memory unit (LMMU) 220 provides access to a linear, non-segmented contiguous data space that is larger than the native address capability of the underlying processor architecture.

In one embodiment of the present invention, it is envisaged that the 'L' register may be divided into multiple elements, such as registers L2, L1, L0, to provide more ways of accessing L via the processor (say, the 8/16-bit core). In one embodiment of the present invention, the number of bits in the 'L' pointer determines the addressable range of the LMMU 220. For example, with a register 'L' of 24 bits, an addressable range of $2^{(24)}$ for the LMMU 220 may be achieved, i.e. 16 Mbytes would be accessible. Alternatively, with a register 'L' of 32 bits, an addressable range of $2^{(32)}$ for the LMMU 220 may be achieved, i.e. 4 Gbytes would be accessible.

The linear management memory unit (LMMU) 220 also provides a linear addressing mode for all instructions that are capable of addressing the LMMU via an extended address bus 235, as will be described later with respect to FIG. 3. The way in which the LMMU 220 is designed enhances the addressing modes of the processor by effectively adding extended addressing to all instructions that can access the [L] register.

The LMMU 220 comprises register and control logic 225, that is accessible by the CPU 205 via both the data communication bus 210 and the address communication bus 215, as further described with respect to FIG. 3. The register and control logic 225 comprises a register decoder (not shown) for decoding register addresses transmitted on the data communication bus 210.

The LMMU 220 further comprises an output multiplexer 230 that is operably coupled to register and control logic 225 as well as the CPU 205 via the address communication bus 215. The output multiplexer 230 is operably coupled to the physical address space 270 of the physical address space 260 via the extended address bus 235 supported by the memory management unit 200 of the present invention.

Referring now to FIG. 3, the linear memory management unit 220 according to one embodiment of the present invention is further illustrated. The LMMU 220 comprises register and control logic 225 having an output 315 coupled to output multiplexer 230. The output multiplexer 230 provides a multiplexed output on an extended address bus 235. The address placed upon the extended address bus is either the program counter or the contents of the L register. The L register being placed on the extended address bus whenever access to registers [L] or [L+] is made, otherwise the extended address bus will be set to the value of the program counter with high order extended address bits not provided by the program counter set to '0'.

A control line 360 is also connected from the register and control logic 225 to the output multiplexer 230 to arrange data placed on the extended address bus 235.

The register and control logic 225 also provides an output 370 to multiplexer logic 310. The multiplexer 310 comprises a control input 365 from the register and control logic 225. The multiplexer 310 also comprises a logical '1' input. The provision of a logical '1' input, say to one or more logic gates (not shown) in the multiplexer enables the value from the AIL register to be passed to an arithmetic logic unit 305, or an adder to the L register of either [L+], [L], etc., which additionally receives a feedback signal 315 from the output of the register and control logic 225.

In accordance with one embodiment of the present invention, the register and control logic 225 is arranged to provide a pointer utilising arithmetic logic unit 305 to provide 'L' index manipulation. Register and control logic 225 comprises a number of registers, as detailed below in Table 1.

TABLE 1

| Name | Use |
| --- | --- |
| L | L' index register |
| [L+] | Accesses data pointed to by contents of 'L' index register, each access increments L by one |
| [L] | Accesses data pointed to by contents 'L' index register |
| AIL | ADD to L index register |

Thus, the 'L' index manipulation, that is accessing data in register and control logic 225 may be performed using:
 (i) incrementing the pointer 375 using (L+) value 345;
 (ii) adding a value to the pointer 375 using the AIL value 355. It is envisaged that the adding function using the AIL value 355 may include XOR logic in addition to, or as an alternative to, an adder logic; or
 (iii) performing no movement of the pointer 375 (i.e. the pointer stays directed to the same position on the [L]

register 350. In this manner, the value in the [L] register 350 is placed on the address bus, but the 'L' register is not incremented.

Thus, an 'L' register resides in a memory map of a normal register. When read/write operations to the L+ register are performed, as pointed to by the L register, these operations are often termed 'indirect addressing operations' as they are looking at a place where the L register is pointing to.

Thus, an 'auto adder' function us supported that performs read/write operations by use of the L+ value to automatically add '1' to the pointer value. The provision of such an 'auto adder' function would normally require modification to the instruction set or core. However, and advantageously, if, say, a 24-bit address is required, the inventive concept supports instructions having a 24-bit address without the need to modify the core to support a 24-bit program counter.

In one embodiment of the present invention, it is envisaged that the arithmetic logic unit may be replaced with any suitable arithmetic logic unit, which may in some instances be an adder or a subtractor.

In one embodiment of the present invention, a size of the 'L' pointer (e.g. the size of the 'L' register used to address a size of physical memory wished to be accessed) is arranged to be flexible so that the pointer can be easily directed to any address of the physical memory. The size of the L register is determined by the size of the extended/physical address space being implemented during the design of the MCU. For example an 18-bit L register would allow the addressing of 131072 locations, whereas a 24-bit L register would allow the addressing of 16.8 Mbytes.

Thus, the LMMU 220 incorporates an arithmetic logic unit (ALU) such as arithmetic logic unit 305, which allows a value to be added to the 'L' pointer. By accessing register [L] the address bus can be set to the value of the L register and read/write operations of the CPU 205 reference this address in memory.

Following access to the pointer 'L' 340, via the index register 'L+' 345, the pointer to the 'L' register will increment be incremented by '1'.

In one embodiment of the present invention, it is envisaged that by mapping the [L+] register 345 to more than one memory location it is possible for the LMMU 220 to perform multi-byte memory accesses whilst correctly incrementing the 'L' register. Thus, a multi-byte read/write operation may be employed.

For example, an 8-bit MCU 205 may be configured to support 16-bit read/write operations as multiple 8-bit transfers. By utilising the [L+] register 345 in multiple adjacent locations, the [L] register 320 will be incremented after the first read/write operation and subsequently by each of the remaining 8-bit transfers. Such an embodiment advantageously supports sequential access to multiple bytes of a larger word size. For example four bytes of a larger word size may be facilitated by defining four sequential instances of L+ 345. After each access to the L+ register 345 the 'L' register will have been updated by four.

In one embodiment of the present invention, it is envisaged that writing a 2's compliment (−128 to +127) to register AIL 355 will cause the AIL register value to be added (for positive values) or subtracted (for negative values) to the [L] register 350.

Referring now to FIG. 4, a method 400 of operation of a linear memory management unit (LMMU) is illustrated according to one embodiment of the present invention. The method commences in step 405 with an MCU (processing core) wishing to access or write to physical address space. The MCU accesses or writes to the physical address space using a linear management function that comprises register and control logic.

The register and control logic comprises a number of mechanisms for writing values to or reading values from the physical address space. A first mechanism, shown in step 410 is reading the memory mapped register L that retrieves the contents of the L pointer. Accessing the [L] memory mapped register places the contents of the 'L' pointer onto the address bus and thus the associated read/write operation is re-directed to the physical memory location defined by the contents of the L register.

A second mechanism is writing a value to the memory mapped register L, which sets the L pointer to the value that has been written, as shown in step 415. Writing a value to the memory mapped register [L] sets the 'L' pointer to the value written.

A third mechanism comprises writing a value to the memory mapped register [AIL], as shown in step 420. This operation has the effect of adding the value to the 'L' pointer. Additional registers can be so defined to enable other operations of the ALU to be performed.

A fourth mechanism comprises writing a value to, or reading a value from the memory mapped register [L+], as shown in step 425. Accessing the [L+] memory mapped register places the contents of the L pointer onto the extended address bus, in step 430. Thus, the associated read/write operation is re-directed to the physical memory location defined by the contents of the L register, as shown in step 435. After accessing the [L+] register the L register is incremented by '1', as indicated in step 440.

It will be understood that the aforementioned flexible register addressing arrangement of the memory management unit (MMU), and method of operation therefor, aims to provide at least one or more of the following advantages:
  (i) The inventive concept provides improved access to data from code running in paged memory.
  (ii) The inventive concept provides easier access to large linear data elements without a need to detect page changes.
  (iii) There is no need to conditionally reset a pointer to point to a paging window, as required in known paged methods.
  (iv) The inventive concept provides auto incrementing of a register 'L' pointer, reducing overhead associated with accessing the data contained therein.
  (v) The inventive concept effectively adds a new extended indirect addressing method to all instructions capable of accessing the linear memory management unit (LMMU).
  (vi) The inventive concept provides simplified coding.
  (vii) The inventive concept provides faster access to large elements in extended memory.

In particular, it is envisaged that the aforementioned inventive concept can be applied by a semiconductor manufacturer to any 8/16-bit microprocessor architecture, for example those of the Freescale™ S08 MCU family. It is further envisaged that, for example, a semiconductor manufacturer may employ the inventive concept in a design of a stand-alone MCU device, or application-specific integrated circuit (ASIC) and/or any other sub-system element employing an 8/16-bit MCU.

It will be appreciated that any suitable distribution of functionality between different functional units or controllers or memory elements, may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved memory management unit (MMU), and method of operation therefor have been described, wherein the aforementioned disadvantages with prior art arrangements have been substantially alleviated.

The invention claimed is:

1. A memory management unit comprises:
a microprocessor controller unit including a program counter having a first address size;
register and control logic arranged to support the microprocessor controller unit accessing physical address space via an address bus, the register and control logic comprises a register having a second address size greater than the first address size; and
a multiplexer including a first input terminal to receive a value in the register of the register and control logic via an output of the register and control logic, a second input terminal to receive a value in the program counter via the address bus of the microprocessor controller unit, and an output terminal, wherein the microprocessor controller unit is arranged to further access the physical address space via a data bus,
wherein the register and control logic is arranged to provide, via the output terminal of the multiplexer, an extended address bus between the microprocessor controller unit and the physical address space,
wherein the multiplexer selectively provides, via the output terminal, one of the value in the program counter and the value in the register of the register and control logic, and
wherein the memory management unit is characterised in that the register and control logic further comprises one or more of the group consisting of:
at least one register increment function;
a register address movement function; and
a register address maintain function.

2. The memory management unit of claim 1 wherein the register and control logic is operably coupled to an arithmetic logic unit arranged to point to an address in the register in response to a control signal.

3. The memory management unit of claim 2 wherein the register and control logic is operably coupled to the output of the multiplexer configured to provide a multiplexed output of an address provided by the microprocessor controller unit and a value generated by the register and control logic on the extended address bus.

4. The memory management unit of claim 2 wherein the arithmetic logic unit is an adder or subtractor.

5. The memory management unit of claim 4 wherein the register and control logic is operably coupled to the output of the multiplexer configured to provide a multiplexed output of an address provided by the microprocessor controller unit and a value generated by the register and control logic on the extended address bus.

6. The memory management unit of claim 4 wherein the memory management unit is arranged to perform index-manipulation of the register in the register and control logic.

7. The memory management unit of claim 1 wherein the memory management unit is arranged to perform index-manipulation of the register in the register and control logic.

8. The memory management unit of claim 7 wherein the register and control logic is operably coupled to the output of the multiplexer configured to provide a multiplexed output of an address provided by the microprocessor controller unit and a value generated by the register and control logic on the extended address bus.

9. The memory management unit of claim 1 wherein the at least one register increment function increments a pointer directed to the register.

10. The memory management unit of claim 9 further wherein the at least one register increment function operates as an automatic incrementing pointer.

11. The memory management unit of claim 1 wherein the register address movement function adds a value to a pointer directed to the register.

12. The memory management unit of claim 1 wherein the register address maintain function places a previous value in the register on the address bus, without incrementing the register.

13. The memory management unit of claim 1 wherein the register and control logic is operably coupled to the output of the multiplexer configured to provide a multiplexed output of an address provided by the microprocessor controller unit and a value generated by the register and control logic on the extended address bus.

14. The memory management unit of any preceding claim 1 further characterised in that wherein the register and control logic comprises at least one memory mapped indirect register.

15. The memory management unit of claim 1 wherein the register and control logic comprises a register divided into multiple elements.

16. The memory management unit of claim 1 wherein instructions handled by the microprocessor controller unit that are able to access the register are capable of using extended addressing.

17. An integrated circuit comprising the memory management unit according to claim 1.

18. The memory management unit of claim 2 wherein the memory management unit is arranged to perform index-manipulation of the register in the register and control logic.

19. A method of accessing an address in physical address space using a memory management unit comprising register and control logic, the method comprising:
- accessing a physical address space, by a microprocessor controller unit comprising a program counter having a first address size, via an address bus coupled between the microprocessor controller unit and a multiplexer, wherein the microprocessor controller unit is arranged to further access the physical address space via a data bus;
- providing, by a register of the register and control logic, an extended address bus between the microprocessor controller unit and the physical address space, wherein a second address size of the register is greater than the first address size of the program counter and an output of the register and control logic is coupled to the multiplexer that provides the extended address bus via an output terminal of the multiplexer receiving, at a first terminal of the multiplexer, a value in the program counter;
- receiving, at a second terminal of the multiplexer, a value in the register of the register and control logic; and
- selectively providing, via the multiplexer, one of the value in the program counter and the value in the register of the register and control logic, wherein the register and control logic uses one or more of the group consisting of:
  - at least one register increment function;
  - a register address movement function; and
  - a register address maintain function.

20. A microprocessor architecture comprising:
a physical address space;
a central processing unit coupled to the physical address space via a data bus, the central processing unit including a program counter having a first address size; and
a memory management unit including:
- register and control logic coupled to the central processing unit via the address bus, the register and control logic arranged to support the central processing unit in accessing the physical address space via the address bus, wherein the register and control logic comprises a register having a second address size greater than the first address size; and
- a multiplexer having a first input terminal coupled to the central processing unit via an address bus to receive a value in the program counter, a second input terminal coupled to an output of the register and control logic to receive a value in the register of the register and control logic, and an output terminal,
- the register and control logic arranged to provide an extended address bus between the central processing unit and the physical address space via the output terminal of the multiplexer, wherein the multiplexer selectively provides, via the output terminal, one of the value in the program counter and the value in the register of the register and control logic, and wherein the register and control logic further comprises one or more of the group consisting of:
  - at least one register increment function;
  - a register address movement function; and
  - a register address maintain function.

* * * * *